United States Patent [19]

Dobson, Jr. et al.

[11] Patent Number: 4,822,500
[45] Date of Patent: Apr. 18, 1989

[54] SATURATED BRINE WELL TREATING FLUIDS AND ADDITIVES THEREFORE

[75] Inventors: James W. Dobson, Jr.; Alan T. Mondshine; Thomas C. Mondshine, all of Houston, Tex.

[73] Assignee: Texas United Chemical Corporation, Houston, Tex.

[21] Appl. No.: 161,765

[22] Filed: Feb. 29, 1988

[51] Int. Cl.$^4$ .................... C09K 7/02; E21B 43/00
[52] U.S. Cl. ........................ 252/8.551; 252/8.51; 252/8.512; 252/8.514
[58] Field of Search .................. 252/8.51, 8.514, 8.551

[56] References Cited

U.S. PATENT DOCUMENTS

| | | | |
|---|---|---|---|
| 3,988,246 | 10/1976 | Hartfiel | 252/8.51 |
| 4,046,197 | 9/1977 | Gruesbeck et al. | 252/8.51 |
| 4,175,042 | 11/1979 | Mondshine | 252/8.551 |
| 4,369,843 | 1/1983 | Mondshine | 252/8.551 X |
| 4,422,947 | 12/1983 | Dorsey et al. | 252/8.51 |

FOREIGN PATENT DOCUMENTS

| | | | |
|---|---|---|---|
| 2086923 | 5/1982 | United Kingdom | 252/8.551 |
| 2110698 | 6/1983 | United Kingdom | 252/8.551 |

*Primary Examiner*—Herbert B. Guynn
*Attorney, Agent, or Firm*—Roy F. House

[57] ABSTRACT

Disclosed are well working and treating fluids comprising a saturated aqueous saline solution, a particulate water soluble salt which is insoluble in the saturated saline solution, xanthomonas gum, and an epichlorohydrin crosslinked hydroxypropyl starch derivative wherein the xanthomonas gum and the epichlorohydrin crosslinked hydroxypropyl starch derivative interact to synergistically enhance the suspension characteristics of the fluid and to decrease the fluid loss of the fluid.

Also disclosed is an additive composition for enhancing the suspension characteristics and reducing the fluid loss of saturated brine based well treating fluids comprising specified proportions of xanthomonas gum and epichlorohydrin crosslinked hydroxypropyl starch.

11 Claims, No Drawings

4,822,500

SATURATED BRINE WELL TREATING FLUIDS AND ADDITIVES THEREFORE

BACKGROUND OF THE INVENTION

The invention relates to well treating fluids for use in the drilling and servicing of wells in subterranean formations. More particularly, it relates to saturated brine fluids having suspended therein one or more water soluble salts which are insoluble in the saturated brine. Such fluids are useful in various well drilling, workover, and completion operations.

Additionally, the invention relates to blends of xanthomonas gum and hydroxypropyl ether of starch which has been crosslinked with epichlorohydrin. These blends exhibit high suspending capacity and enchanced fluid loss control in saturated saline solutions.

After a well has been drilled into the earth's surface, one or more subterranean producing formations may be encountered. It is then desirable to complete the well so as to obtain the maximum hydrocarbon production from such subterranean producing formations, and to complete such well in a manner so that the pressure in the subterranean producing formations is controlled during completion operations, while bridging or sealing off the producing formation to inhibit damage thereto and to minimize fluid loss into the formation which might inhibit or in some cases substantially reduce the production of hydrocarbons from the subterranean producing formation.

Also, it is desirable or necessary after a period of time to perform workover or other service operations on a previously drilled well, and during such workover or service operations, it is desirable to control the pressure in the subterranean producing formation or formations while at the same time bridging or sealing off the formations in a manner so as to minimize particle invasion and fluid loss into the producing formation or formations and thereby reduce if not substantially eliminate damage to the formations.

In addition to the necessary required density characteristics of a workover and completion fluid, it is desirable to seal off or temporarily plug the face of the subterranean producing formation or formations in the well bore so that during the completion and workover operation fluid and solids in the fluid are not lost to the producing formation which might cause damage thereto.

Heretofore various types of workover and completion fluids with components therein of a particle size to bridge and seal off the producing formations have been employed. Workover and completion fluids should have fluid loss (filter loss) control to prevent substantial fluid invasion of the formation. This is achieved by a combination of a fluid loss control agent and a bridging agent.

Various types of soluble or degradable bridging materials are available commercially, and the choice between them depends on reservoir conditions and type of operation. Sized particles of oil-soluble resins or waxes have been used as bridging agents for oil reservoirs. Such particles must be removed by dissolving them in oil when used in dry gas reservoirs or water injection wells. Calcium carbonates were the first degradable bridging particles to be used in workover and completion fluids. On completion of the job, they are removed with acid if necessary. Acidization is an extra operation and additional expense, except in carbonate reservoirs that must be acidized. Furthermore, the acid may dissolve iron on the way down to the acidizing zone and introduce iron compounds into the formation. Then, when the acid is spent, the pH rises, iron hydroxide is precipitated, and formation damage results. All of the carbonate particles may not be contacted by the acid. To avoid this problem, alternate slugs of acid and diverting agent are necessary.

Workover and completion fluids can be formulated utilizing sized particles of a water soluble salt as a bridging agent suspended in a saturated brine solution in which the salt is substantially insoluable. See U.S. Pat. Nos. 4,175,042; 4,186,803; and 4,369,843.

These treating fluids comprise a saturated aqueous saline solution with at least one water soluble salt which is substantially insoluble in the saturated saline solution, the water soluble salt having a particle size range of about 5 microns to about 800 microns with greater than 5 percent of the particles being coarser than 44 microns to control the pressure in the formation while bridging and sealing it, and also minimizing particle invasion to the formation. A minor amount of fluid loss additive to inhibit loss of fluid into the subterranean producing formation, and a suspension additive to prevent settling of the water soluble salt particles is included in the treating fluid. The water soluble salt which is substantially insoluble in the saline solution is added in sufficient quantity to control the pressure in the producing formation by increasing the density of the treating fluid.

The bridging and sealing salt particles used in the well completion and workover method can be dissolved by the flow of produced field brine or by the injection of water or an unsaturated saline solution. This eliminates the undesirable use of oil or acid solution to remove the bridge from the subterranean hydrocarbon producing formation. The saturated saline solution is formed by dissolving a salt or mixture of salts in water and normally the minimum density of the saturated saline solution is approximately at least 1.2 grams per cubic centimeter.

It is also disclosed in Gruesbeck et al. U.S. Pat. No. 4,046,197 to suspend finely divided particles of a water soluble salt in a saturated aqueous saline solution having a density of at least about 1.2 g/cc at 10° C. in an amount sufficient to substantially increase the overall density of the fluid. Preferably the average size of the suspended salt particles is less than about 10 microns. Mondshine U.S. Pat. No. 4,621,692 discloses a method of protecting the perforations during workover and completion operations utilizing a saturated saline solution having sized water soluble salt bridging particles suspended therein.

SUMMARY OF THE INVENTION

We have discovered that well treating fluids comprising a saturated aqueous saline solution having suspended therein particles of a water soluble salt which is insoluble in the saturated saline solution and containing a xanthomonas (xanthan) gum suspension additive can be markedly improved in suspension characteristics and fluid loss control by incorporating therein an additive which comprises hydroxypropyl ether of starch which is crosslinked with epichlorohydrin. Moreover, blends of xanthomonas gum and epichlorohydrin crosslinked, hydroxypropyl starch ether in which the xanthomonas gum comprises from about 2% to about 86% by weight by the total blend and epichlorohydrin crosslinked, hydroxypropyl starch ether corresponding comprises from about 14% to about 86% by weight of the total blend exhibit pronounced suspension characteristics and fluid loss control in saturated saline solutions as compared to (1) the xanthomons gum alone, (2) the epichlorohydrin crosslinked, hydroxpropyl starch ether alone, and (3) xanthomonas gum in combination with (a) non-cross-linked hydropropyl starch ether, and (b) hydroxypropyl starch ether crosslinked with other multi-functional crosslinking additives such as phosphorous oxychloride.

DESCRIPTION OF THE PREFERRED EMBODIMENTS

The saturated saline solution of the present invention is formed by dissolving a salt or mixture of salts in water and normally the minimum density of the saturated saline solution is approximately 1.2 g/cm$^3$. In those solutions where it is desirable to employ the present invention with a density less than 1.2 g/cm$^3$ the saturated saline solutin can be diluted with some suitable substance such as oil. In addition, the density of the saturated saline solution can be increased by the addition of a weighting agent to provide a well treating fluid with bridging agents having a density up to 2.5 g/cm$^3$ on higher when desired. Additional quantity of a water soluble salt which is insoluble in the saturated saline solution may be added to increase the density as may be desired.

The saturated saline solution can be formed by dissolving any suitable salt or mixture of compatible salts in water. Some salts that are generally available and which may be used include potassium chloride, sodium chloride, calcium chloride, zinc chloride, potassium bromide, sodium bromide, calcium bromide, zinc bromide, sodium sulfate, sodium carbonate, potassium carbonate, and sodium bicarbonate. Preferred salts are solium chloride, calcium chloride, potassium chloride, sodium bromide, calcium bromide, potassium bromide, and zinc bromide.

Any water soluble salt which is insoluble in the saturated saline solution may be employed. Some salts which are generally available include sodium chloride, calcium chloride, potassium chloride, sodium sulfate, sodium carbonate, sodium bicarbonate, potassium carbonate, and calcium bromide. A mixture of salts may be used if desired. Preferred are sodium chloride and calcium chloride.

The particle size of the water soluble salt may generally range from 1 micron to 2000 microns depending upon the particular use of the well treating fluid. Thus when the particulate water soluble salt is added to increase the density of the fluid, the smaller the particle size of the salt the easier it is to suspend. As indicated in Gruesback it al U.S. Pat. No. 4,046,197, it is preferred in this case to have an average particle size of less than about 10 microns. When the particulate salt is added to form a bridge and seal on subterranean formation contacted by the well treating fluid, the particulate salt should have a wide particle size distribution. As disclosed in Mondshine U.S. Pat. No. 4,175,042, a preferred particle size range is from about 5 microns to about 800 microns with greater than about 5% by weight of the particles being coarser than 44 microns. However, for gravel packing operations, less than 5% by weight of the particles can be greater than about 44 microns for a successful gravel pack. A coarser particle size can be used as needed, especially when used as a bridging agent for controlling lost circulation in higher permeability formations. In extremely high permeability formations, fractured formations, or vugular type formations, the particle size should be expanded to include particles as high as 2000 microns for effective bridging.

The quantity of the particulate water soluble salt will vary depending upon achieving the desired effect. Thus concentration as high as 850 kg/m$^3$ of well treating fluid may be required to obtain the desired density. For bridging, concentrations from about 10 kg/m$^3$ to about 150 kg/m$^3$ of well treating fluid will normally be required.

The saturated saline solution with the salt particles therein must contain an additive to maintain the salt particles in suspension and an additive to provide a low fluid loss to the well treating fluid.

We have discovered that a xanthomonas gum and an epichlorohydrin crosslinked, hydroxypropyl starch ether synergistically combine to provide suspension and fluid loss control to saturated saline solutions containing particles of water soluble salts therein.

Xanthomonas gum is available commercially. It is a widely used viscosifier and suspending agent in a variety of fluids. Xanthomonos gum can be made by the fermentation of carbohydrate with bacteria of the genus Xanthomonas. Representative of these bacteria are Xanthomonas campestris, Xanthomonas phaseoli, Xanthomonas mulvacearn, Xanthomonas carotoe, Xanthomonas traslucens, Xanthomonas hederae, and Xanthomonas papavericoli. The gum produced by the bacteria Xanthomonas campestris is preferred for the purpose of this invention. The fermentation usually involves inoculating a fermentable broth containing a carbohydrate, various minerals and a nitrogen yielding compound. A number of modifications in the fermentation procedure and subsequent processing are commercially used. Due to the variety of fermentation techniques and difference in processing operation subsequent to fermentation, different production lots of xanthomonas gum will have somewhat different solubility and viscosity properties. Xanthomonas gums useful in the practice of the present invention are relatively hydratable xanthomonas gums.

The colloid is a polymer containing mannose, glucose, glucuronic acid salts such as potassium glucuronate, sodium glucuronate, or the like, and acetyl radicals. Other Xanthomonas bacteria have been found which produce the hydrophilic gum and any of the xanthan gums and their derivatives can be used in this invention.

Xanthan gum is a high molecular weight linear polysaccharide that is readily soluble in water to form a viscous fluid. Examplary of the xanthan gums that can be employed is an industrial grade of xanthan gum marketed by the Kelco Company under the trademark Kelzan XC xanthan gum. Xanthan gum increases the gel strength of the fluid without appreciably increasing its viscosity.

The starch derivative used in the present invention is a particular crosslinked, hydroxypropyl ether which when combined with xanthomonas gum in a saturated saline solution containing water soluble salt particles synergistically decreases the fluid loss and increases the suspension characteristics of the resulting well treating fluid.

Starch is a natural polymer containing an abundance of hydroxyl groups. Each anhydroglucose unit contains two secondary hydroxyls and a large majority contain primary hydroxyls. These hydroxyls potentially are able to react with any chemical capable of reacting with alcoholic hydroxyls. This would include a wide range of compounds such as acid anhydrides, organic chloro compounds, aldehydes, epoxy, ethylenic compounds, etc. When the specific chemical contains two or more moieties capable of reacting with hydroxyl groups, there is the possibility of reacting two different hydroxyls resulting in crosslinking between hydroxyls on the same molecule or on different molecules.

The reaction conditions used in making cross-linked starches vary widely depending upon the specific bi-or polyfunctional reagent used for the cross-linking. In general, most of the reactions are run on aqueous suspensions of starch at temperatures ranging from room temperature up to about 50° C. Often an alkali such as sodium hydroxide is used to promote reaction. The reactions are normally run under neutral to fairly alkaline conditions, but below the level which will peptize or swell the starch. If the cross-linking reaction is run in an aqueous suspension of starch, when the desired level of cross-linking (usually as measured by some type of viscosity or rheology test) is reached, the starch suspension is neutralized and the starch is filtered and washed to remove salts, any unreacted reagent, and other impurities produced by side reactions of the cross-linking reagent with water. Konigsberg U.S. Pat. No. 2,500,950 discloses the crosslinking of starch with epoxyhalogan compounds such as epichlorohydrin.

The chemistry of starch and the preparation of a multitude of derivatives thereof is well known. A recent book entitled "Modified Starches: Properties and Uses", by O.B. Wurzburg, 1986 (CRC Press, Inc., Boca Raton, Florida, U.S.A.) is an excellent source for information in the preparation of starch derivatives. In regards to the preparation of this epichlorohydrin crosslinked hydroxypropyl ether starches of this invention, the chapters entitled "Crosslinked Starches" and "Hydroxypropylated Starches" are particularly pertinent.

It is preferred that the starch for use in the present invention be crosslinked with epichlorohydrin in a basic aqueous starch suspension at a temperature and for a period of time such that the Brabender viscosity of the suspension is within about 50% to 100% of the maximum viscosity which can be obtained in the starch suspension, as determined experimentally, most preferably from about 75% to 100% of the maximum viscosity. The viscosity will vary by the amount of crosslinking and the test conditions, i.e., temperature, concentrations, etc. A viscosity peak indicates maximum crosslinking. When the desired viscosity is reached, the crosslinking reaction is terminated. A Brabender Viscometer is a standard viscometer readily available on the open market and well known to those skilled in the art.

The epichlorohydrin crosslinked starch is then reacted with propylene oxide to form the hydroxypropyl ether. The reaction of propylene oxide and starch is base catalyzed. Aqueous slurry reactions are generally catalyzed by 0.5 to 1% sodium hydroxide based on the dry weight of starch. Sodium sulfate or sodium chloride may be added to keep the starch from swelling during reaction with the propylene oxide. Reaction temperatures are generally in the 37.7° to 51.7° C. (100° to 125° F.) range. Propylene oxide levels generally range from about 1% to about 10% based on the dry weight of the starch. Propylene oxide-starch reactions take approximately 24 hours to complete under the conditions described and are about 60% efficient with respect to the propylene oxide. It is preferred that the epichlorhydrin crosslinked hydroxypropyl starch ether contain from about 0.5% to about 5% reacted propylene oxide based on the dry weight of starch.

Other methods of preparing epichloroydrin crosslinked starches and hydroxypropyl starch ethers are well known in the art.

The well treating fluids of the invention comprising a saturated aqueous saline solution with water soluble salt particles suspended therein will contain an amount of xanthomonas gum and epichlorohydrin crosslinked hydroxypropyl starch to effectively suspend the water soluble salt and to effectively decrease the fluid loss of the fluid. Generally, the xanthomonas gum will be used in concentrations from about 0.5 kg to about 5.7 kg per $m^3$ of well treating fluid, and the epichlorohydrin crosslinked, hydroxypropyl starch derivative will be used in concentrations from about 0.7 kg to about 42 kg per $m^3$ of well treating fluid. Preferably the concentration of xanthomonas gum will be from about 0.7 kg to about 4.3 kg per $m^3$ of well treating fluid, and the concentration of epichlorohydrin crosslinked, hydroxypropyl starch will be from about 5.7 kg to about 28.5 kg per $m^3$ of well treating fluid.

It is preferred in the practice of this invention that the xanthomonas gum and the epichlorohydrin crosslinked hydroxypropyl starch ether by blended together and utilized as an additive to saturated aqueous saline solutions. The additive blend comprises from about 2% to about 86% by weight xanthomonas gum and from about 14% to about 98% by weight epichlorhydrin crosslinked hydroxypropyl starch. In a preferred embodiment of the invention the additive comprises from about 3% to about 30% by weight xanthomonas gum and from about 70% to about 97% by weight of epichlorohydrin crosslinked hydroxypropyl starch. The additive blend can be suspended in a suitable liquid which has no appreciable swelling effect on the additive blend in order to prepared a liquid concentrate for easy handling, as is well known in the art.

The additive blend is employed in the saturated aqueous saline solution in an effective amount which will provide the desired suspension and fluid loss characteristics to the fluid. This amount will vary depending on the composition of the blend, the composition of the saturated aqueous saline solution, and the type, particle size distribution, and amount of water soluble salt particles suspended in the saturated solution. As a general observation, good suspension and fluid loss reduction is obtained with an effective amount of from about 5.7 kg to about 42 kg per $m^3$ of the well treating fluid. Preferably, from about 8.5 kg to about 28.5 kg of the additive per $m^3$ of fluid will be employed. Economic considerations and rheological properties will normally determine the upper concentration used, whereas the rheological properties and fluid loss reduction will normally determine the lower concentration used.

Additionally, the xanthomonas gum and the epichlorhydrin crosslinked, hydroxypropyl starch ether can be admixed with a suitable water soluble salt having a particle size in the range from about 1 micron to about 2000 microns.

A preferred blend comprising the (1) xanthomonas gum, (2) epichlorohyrin crosslinked hydroxypropyl starch, and (3) water soluble salt comprises from about 0.025% to about 2.5% by weight xanthomonas gum, from about 2% to about 8% by weight epichlorohydrin crosslinked hydroxypropyl starch ether, and from about 89.5% to about 98% by weight sized water soluble salt having a particle size distribution within the range from about 1 micron to about 2000 microns, as indicated hereinbefore. This blend will be added to a saturated saline solution in an effective amount to provide adequate suspension of the water soluble salt particles, to provide the desired fluid loss control, and to provide the desire density to the well treating fluids.

The xanthomonas gum and the epichlorohydrin crosslinked, hydroxypropyl starch interact in the saturated aqueous saline solution to provide suspension and fluid loss control. Although the mechanism by which these two polymers interact is not known, the interaction is unique in that xanthomonas gum in combination with other starch derivatives such as non-crosslinked hydroxypropyl starch, phosphorus oxychloride crosslinked hydroxypropyl starch, crosslinked hydroxyethyl starch and the like do not exhibit the suspension and fluid loss control exhibited by the combination of xanthomonas gum and epichlorohydrin crosslinked hydroxypropyl starch.

The following examples describe the manner and process of making and using the invention and set forth the best mode comtemplated by the inventors for carrying out the invention but are not to be construed as limiting.

In the data presented in the tables to follow, the following units are used:

Plastic Viscosity=mPa.s;

Yield Point=kg/m$^2$;

Gel Strength=kg/m$^2$;

Spurt Loss=cm$^3$;

Filtrate=cm$^3$.

All rheology data were determined by the American Petroleum Institute standard API RP 13B. All filtration data were obtained by a modified API filtration test. Thus to an API high temperature filtration cell with removable end cages is added a screen having 44 micron openings. There is then added either 67.5 grams or 135 grams of a sized sand to produce either a 1.5 cm sand bed or a 3.0 cm sand bed. The sized sand has a particle size such that all of the sand passes through a screen having 177 micron openings and is retained on a screen having 125 micron openings. The fluid to be tested is poured along the inside edge of the filteration cell so as not to disturb the sand bed. The filtration test is then conducted for 30 minutes at the desired temperature under a pressure differential of 17.59 kg/cm$^2$ (250 pounds per square inch) supplied by nitrogen.

EXAMPLE 1

A well treating fluid having a density of 1.44 g/cm$^3$ was prepared by adding to 262.5 cm$^3$ of saturated sodium chloride solution 0.6 g of xanthomonas gum, 7.0 g of an epichlorohydrin crosslinked hydroxypropyl starch and 190 g of sodium chloride having a particles size such that about 90% passes through a screen having 44 micron openings. Thus this well treating fluid contained 1.71 kg/m$^3$ of xanthomonas gum, 20 kg/m$^3$ of epichlorohydrin crosslinkedd hydroxypropyl starch, and 543 kg/m$^3$ of the sized NaCl particles. The well treating fluid was tested for rheology and filtration characteristics. The data obtained are given in Table I.

This sample of epichlorohydrin crosslinked hydroxypropyl starch was prepared by reacting epichlorohydrin in a basic suspension of waxy corn starch until the viscosity reached about 90% of the maximum attainable viscosity, and thereafter reacting the crosslinked starch with propylene oxide such that this starch derivative contained about 1.3% by weight reacted propylene oxide.

EXAMPLE 2

Example 1 was repeated except that the sample of epichlorohydrin crosslinked hydroxypropyl starch was prepared by reacting epichlorohydrin in a basic suspension of starch until the viscosity reached its maximum value, and thereafter reacting the epichlorohydrin crosslined starch with propylene oxide such that this starch derivative contained about 1.2% by weight of reacted propylene oxide.

The data obtained for this well treating fluid are given in Table I.

COMPARATIVE EXAMPLES A, B, AND C

Example I was repeated except that the starch derivative used was as follows:

Example A: Waxy corn starch crosslinked with phosphorus oxychloride until the maximum viscosity was obtained, and thereafter reacted with propylene oxide until about 1.2% by weight propylene oxide was present in the starch derivative.

Example B: Waxy corn starch reacted with propylene oxide until about 1.2% by weight propylene oxide was present in the starch derivative.

Example C: Waxy corn starch reacted with propylene oxide until about 1.5% by weight propylene oxide was present in the starch derivative.

The data obtained for these well treating fluids, which are not an example of the present invention, are given in Table I.

EXAMPLE 3

A well treating fluid having a density of 1.26g/cm$^3$ was prepared by mixing together 329 cm$^3$ of saturated NaCl solution, 1 g. of xanthomonas gum, 3 g. of the epichlorohydrin crosslinked hydroxypropyl starch of Example 2, and 46 g. of sodium chloride having a particle size such that about 90% passes through a screen having 44 micron openings. Thus this well treating fluid contained 2.87 kg/m$^3$ xanthomonas gum, 8.57 kg/m$^3$ of the epichlorohydrin crosslinked hyroxypropyl starch, and 131 kg/m$^3$ of the sized NaCl particles.

This well treating fluid was tested for rheology and filtration characteristics. The fluid was then hot rolled in a oven for 16 hours at 65.5° C. and re-tested. Another sample of the fluid was static aged at 93.3° C. for 16 hours and tested. The data obtained are given in Table II.

EXAMPLE 4

Well treating fluids were prepared in a saturated NaCl solution such that the well treating fluids contained 91.4 kg/m$^3$ of sodium chloride and the amounts of xanthomonas gum and the epichlorohydrin crosslinked hydroxypropyl starch of Example 2 which are indicated in Table III. The well treating fluids were static aged for 16 hours at 93.3° C. and tested for rheology and filtration characteristics. The data obtained are given in Table III.

COMPARATIVE EXAMPLE D

A well treating fluid was prepared and tested as in Example 4, except that the fluid did not contain any xanthomonas gum. The data obtained are given in Table III.

COMPARATIVE EXAMPLE E

A well treating fluid was prepared and tested as in Example 4 except that the fluid did not contain any epichlorohydrin cross-linked hydroxypropyl starch. The data obtained are given in Table III.

EXAMPLE 5

Various blends of xanthomonas gum and the epichlorohydrin crosslinked hydroxypropyl starch of Example 2 were prepared as indicated in Table IV. Well treating fluids were prepared in saturated NaCl brine from these additive blends having the composition indicated in Table IV. The fluids were tested for rheology and filtration characteristics before and after hot rolling in an oven at 76.7° C. for 16 hours. The data obtained are given in Table IV.

EXAMPLE 6

A well treating fluid was prepared as in Example 3. This fluid was static aged at 87.8° C. for 16 hours and observed for suspension of the salt particles. The fluid was homogeneous indicating excellent suspension characteristics.

COMPARATIVE EXAMPLES F, G, H, AND I

Well treating fluids were prepared as in Example 6 except that the epichlorohydrin crosslinked hydroxypropyl starch was replaced by other starch products or omitted. These fluids were evaluated as in Example 6, with the following results: Example F—Pre-gelatinized starch additive—particles settled; Example G—the phosphorus oxychloride crosslinked hydroxypropyl starch of Example A—partial settling of particles, hard packing on bottom of container; Example H—the non-crosslinked hydroxypropyl starch of Example B—partial settling of particles, hard packing on bottom of the container; Example I—no starch derivative—particles settled.

TABLE I 1.44 g/cm³ Well Treating Fluids Containing Saturated NaCl, 1.71 kg/m³ xanthomonas Gum, 20 kg/m³ Starch Derivative, and 543 kg/m³ NaCl Particles.

| Fluid Properties | Example | | | | |
|---|---|---|---|---|---|
| | 1 | 2 | A | B | C |
| Plastic Viscosity | 48 | 68 | 48 | 59 | 60 |
| Yield Point | 1.85 | 3.03 | 1.76 | 1.85 | 2.0 |
| 10-Second Gel Strength | 0.39 | 0.68 | 0.29 | 0.34 | 0.39 |
| 10-Minute Gel Strength | 0.49 | 0.93 | 0.39 | 0.44 | 0.49 |
| Sand Bed[(1)] Spurt Loss @ 93.3° C. | 2 | 1.5 | 5 | 3 | 2 |
| Sand Bed Filtrate @ 93.3° C. | 9.5 | 2.5 | NC[(2)] | NC | NC |

[(1)]1.5 cm Sand Bed
[(2)]NC = No Control, essentially complete fluid loss

TABLE II 1.26 g/cm³ Well Treating Fluid Containing Saturated NaCl, 2.86 kg/m³ Xanthomonas Gum, 8.57 kg/m³ Epichorohydrin Cross-linked Hydroxypropyl Starch, and 131 kg/m³ Suspended NaCl Particles

| Fluid Properties | Initial | Hot Rolled 16 Hours @ 65.5° C. | Static Aged 16 Hours @ 93.3° C. |
|---|---|---|---|
| Plastic Viscosity | 15 | 13 | 15 |
| Yield Point | 0.83 | 0.93 | 0.93 |
| 10-Second Gel Strength | 0.29 | 0.34 | 0.34 |
| 10-Minute Gel Strength | 0.34 | 0.39 | 0.39 |
| Sand Bed[(1)] Spurt Loss @ 93.3° C. | 2.5 | 3 | 2.5 |
| Sand Bed Filtrate @ 93.3° C. | 8.5 | 7 | 6.2 |
| pH | 7.7 | 6.0 | 5.6 |

[(1)]1.5 cm Sand Bed

TABLE III

Well Treating Fluids Containing Saturated NaCl Brine, the Indicated Concentration of Xanthomonas Gum and Epichlorohydrin Crosslinked Hydroxypropyl Starch, and 91.4 kg/m³ of NaCl Particles.

| | Example | | | | |
|---|---|---|---|---|---|
| | 4 | 4 | 4 | D | E |
| Xanthomonas Gum, kg/m³ | 2.86 | 2.86 | 1.43 | 0 | 2.86 |
| ECHPS[(1)], kg/m³ | 5.71 | 8.57 | 14.3 | 28.6 | 0 |
| Plastic Viscosity | 11 | 13 | 14 | 11 | 9 |
| Yield Point | 0.63 | 0.73 | 0.54 | 0.24 | 0.44 |
| 10-Second Gel Strength | 0.24 | 0.29 | 0.15 | 0 | 0.20 |
| 10-Minute Gel Strength | 0.49 | 0.49 | 0.15 | 0.05 | 0.24 |
| pH | 6.93 | 6.82 | 7.03 | 7.3 | 7.6 |
| Sand Bed[(2)] Spurt Loss @ 93.3° C. | Trace | 0 | 0 | 15 | 10 |
| Sand Bed[(2)] Filtrate @ 93.3° C. | 5.0 | 3.8 | 4.5 | 40 | 55 |

[(1)]ECHPS = Epichlorohydrin Crosslinked Hydroxypropyl Starch
[(2)]1.5 cm Sand Bed

TABLE IV

| | Fluid Density, g/cm³ | | | |
|---|---|---|---|---|
| | 1.26 | 1.32 | 1.44 | 1.50 |
| Fluid Composition | | | | |
| Additive Blend, kg/m³ | 11.43 | 17.14 | 18.57 | 22.86 |
| % XC Polymer[(1)] in Blend | 25.0 | 12.5 | 5.77 | 3.1 |
| % ECHPS[(2)] in Blend | 75.0 | 87.5 | 94.23 | 96.9 |
| NaCl Particles, kg/m³ | 131 | 263 | 543 | 677 |
| Initial Fluid Properties | | | | |
| Plastic Viscosity | 15 | 23 | 42 | 60 |
| Yield Point | 0.73 | 0.93 | 1.51 | 2.10 |
| 10-Second Gel Strength | 0.24 | 0.20 | 0.24 | 0.29 |
| 10-Minute Gel Strength | 0.29 | 0.24 | 0.39 | 0.39 |
| pH | 7.4 | 7.4 | 7.4 | 7.2 |
| Sand Bed[(3)] Filtrate @ 121° C. | 4.0 | 1.0 | 0 | 1.0 |
| Fluid Properties After Hot Rolling at 76.7° C. for 16 Hours | | | | |
| Plastic Viscosity | 14 | 24 | 46 | 87 |
| Yield Point | 0.98 | 1.46 | 2.39 | 2.83 |
| 10-Second Gel Strength | 0.34 | 0.34 | 0.44 | 0.39 |
| 10-Minute Gel Strength | 0.44 | 0.44 | 0.49 | 0.49 |
| pH | 6.0 | 5.9 | 6.5 | 6.5 |
| Sand Bed[(3)] Filtrate @ 121° C. | 5.0 | 0 | 0 | 0 |

[(1)]XC Polymer is a xanthomonas gum from Kelco Co.
[(2)]ECHPS is the epichlorohydrin crosslinked hydroxypropyl starch of Example 2.
[(3)]3.0 cm Sand Bed The inveniton can be used in the various applications involved in completions and workover operations where densities above 1.2 g/cm³ are required. Such applications include:

A. Completion and Workover Systems with Fluid Loss Control
B. Kill Fluids to Control Pressure
C. Lost Circulation Pills to Prevent Loss of Brines
   a. Unconsolidated sands b. Microfractures
    c. Massive Fractures and Vugular Formations
  D. Disposal and Injection Wells
  E. Drilling into Productive Formations
    a. Minimize Formation Damage
    b. Protect Water and Oil Sensitive Formations
    c. Eliminate Solids Invasion
    d. Control Water Invasion
  F. Perforating
    a. Post Perforating Lost Circulation Pills
    b. Perforating Fluids to Prevent Invasion in Overbalanced Perforating
  G. Gravel Packing
    a. Underreaming
    b. Sand Washing of Cased Hole Perforations
    c. Plasticizer for Two-Stage Gravel Placement
    d. Stabilizing Underreamed or Sand Washed Hole for Production Screen Placement
    e. Gravel Carrier Fluid
    f. Pill Placement to Control Loss of Clear Solutions During Gravel Placement
  H. Fracturing
    a. Controlling Fluid Loss
    b. Diverting for Acid Treatment The well treating fluids of this invention can contain other conventional wellbone additives as desired, such as oil, viscosifiers such as hydroxyethyl cellulose, carboxymethyl cellulose, and other gums, lignosulfonate salts such as calcium or chromium liqnosulfonates, emulsifiers, weighting agents, corrosion inhibitors. calcium carbonate, magensia, other starch derivatives, and the like, as is well known in the art.

What is claimed is:

1. A well treating fluid comprising a saturated aqueous saline solution, a water soluble particulate salt which is insoluble in the saturated aqueous saline solution, a xanthomonas gum, and an epicholorhydrin crosslinked hydroxypropyl starch wherein the concentration of the xanthomonas gum is from about 0.5 kg/m$^3$ to about 5.7 kg/m$^3$ of the well treating fluid and the concentration of the epichlorohydrin crosslinked hyroxypropyl starch is from about 0.7 kg/m$^3$ to about 42 kg/m$^3$ of the well treating fluid.

2. The well treating fluid of claim 1 wherein the concentration of the xanthomonas gum is from about 0.7 kg/m$^3$ to about 4.3 kg/m$^3$ of the well treating fluid, and the concentration of the epichlorohydrin crosslinked hydroxypropyl starch is from about 5.7 kg/m$^3$ to about 28.5 kg/m$^3$ of the well treating fluid.

3. The well treating fluid of claim 1 wherein the concentraton of the water soluble particulate salt is from about 10 kg/m$^3$ to about 850 kg/m$^3$ of the well treating fluid.

4. An additive for imparting suspension characteristics and fluid loss control to well treating fluids which comprises from about 2% to about 86% by weight of xanthomonas gum and from about 14% to about 98% by weight of epichlorohydrin crosslinked hydroxypropyl starch.

5. The additive of claim 4 containing from about 3% to about 30% by weight xanthomonas gum and from about 70% to about 97% by weight of epichlorohydrin crosslinked hydroxypropyl starch.

6. A well treating fluid comprising a saturated aqueous saline solution, a water soluble particulate salt which is insoluble in the saturated aqueous saline solution, and sufficient of the additive of claim 4 to suspend the particulate salt in the fluid and to impart the desired degree of fluid loss control to the fluid.

7. The well treating fluid of claim 6 wherein the concentration of the additive is from about 5.7 kg/m$^3$ to about 42 kg/m$^3$ of the well treating fluid.

8. The well treatig fluid of claim 1, 2, 3, 6, or 7, wherein the saturated aqueous saline solution is saturated aqueous sodium chloride solution, and wherein the water soluble particulate salt is sodium chloride.

9. The well treating fluid of claim 1, 2, 3, 6, or 7, wherein the epichlorohydrin crosslinked hydroxypropyl starch is crosslinked to the extent that the viscosity of the starch in aqueous suspension is within about 50% to 100% of the maximum viscosity which can be obtained in the aqueous suspension.

10. The additive of claim 4 or 5 wherein the epichlorohydrin crosslinked hydroxypropyl starch is crosslinked to the extent that the viscosity of the starch in aqueous suspension is within about 75% to 100% of the maximum viscosity which can be obtained in the aqueous suspension, and wherein the epichlorohydrin crosslinked hydroxypropyl starch contains from about 0.5% to about 5% reacted propylene oxide based on the dry weight of the starch.

11. A well treating fluid comprising a saturated aqueous saline solution of one or more compatible salts selected from the group consisting of sodium chloride, calcium chloride, potassium chloride, zinc chloride, sodium bromide, calcium bromide, potassium bromide, zinc bromide, sodium sulfate, sodium carbonate, sodium bicarbonate, and potassium carbonate, a water soluble particulate salt which is insoluble in the saturated aqueous solution selected from the group consisting of sodium chloride, calcium chloride, potassium chloride, zinc chloride, sodium bromide, calcium bromide, potassium bromide, sodium sulfate, sodium carbonate, sodium bicarbonate, potassium carbonate, and mixtures thereof, xanthomonas gum in an amount from about 0.7 kg/m$^3$ to about 4.3 kg/m$^3$ of the well treating fluid, and epichlorohydrin crosslinked hydroxypropyl starch in an amount from about 5.7 kg/m$^3$ to about 28.5 kg/m$^3$ of the well treating fluid, wherein the concentration of the water soluble particulate salt is from about 10 kg/m$^3$ to about 850 kg/m$^3$ of the well treating fluid.

* * * * *